United States Patent [19]
Rudolph et al.

[11] Patent Number: 5,643,996
[45] Date of Patent: Jul. 1, 1997

[54] INORGANIC POWDER COMPOSITION CONTAINING POLYMERIC AUXILIARIES AND USE THEREOF

[75] Inventors: Jürgen Rudolph; Wolfgang Meyer; Gerhard Wegner; Friedrich Hessel, all of Mainz; Katharina Seitz, Frankfurt am Main; Andreas Roosen, Hofheim/Taunus, all of Germany

[73] Assignee: Hoechst Aktiengesellschaft, Frankfurt am Main, Germany

[21] Appl. No.: 617,429

[22] Filed: Mar. 18, 1996

Related U.S. Application Data

[63] Continuation of Ser. No. 160,735, Dec. 3, 1993, abandoned.

[30] Foreign Application Priority Data

Dec. 5, 1992 [DE] Germany ............ 42 40 979.9

[51] Int. Cl.$^6$ .................. C08L 53/00; C08K 3/22
[52] U.S. Cl. .......... 524/561; 524/428; 524/437; 524/539; 524/556; 524/560; 525/94; 525/299
[58] Field of Search .................. 524/556, 437, 524/478, 539, 560, 561; 525/94, 299

[56] References Cited

U.S. PATENT DOCUMENTS

| | | | |
|---|---|---|---|
| 4,032,628 | 6/1977 | Papantoniou | 424/63 |
| 5,053,306 | 10/1991 | El-Sayed et al. | 430/137 |
| 5,219,945 | 6/1993 | Dicker et al. | 525/276 |
| 5,318,999 | 6/1994 | Mitra et al. | 525/94 |

FOREIGN PATENT DOCUMENTS

| | | |
|---|---|---|
| 0298667 | 1/1989 | European Pat. Off. . |
| 0466261 | 1/1992 | European Pat. Off. . |
| 2005697 | 4/1979 | United Kingdom . |

OTHER PUBLICATIONS

Aldinger et al., "The Importance Of Chemistry In The Development Of High–Performance Ceramics", Angewandte Chemie, vol. 26, No. 5, May 1987, pp. 371–381.

Billingham et al., "Group–Transfer Synthesis Of Methacrylic Copolymers And Some Applications Of The Products", Macromolecules 1992, University of Kent, Sep. 7–11, 1992.

Böhnlein–Mauss et al., "The Function Of Polymers In The Tape Casting Of Alumina", Advanced Materials, vol. 4, No. 2, Feb. 1992, pp. 73–81.

*Primary Examiner*—Andrew E. C. Merriam
*Attorney, Agent, or Firm*—Foley & Lardner

[57] ABSTRACT

A composition of inorganic powders comprises inorganic powder, dispersant and binder. The dispersant and/or binder used is a block copolymer of the units methacrylic acid and alkyl methacrylate in which the alkyl radical can comprise from 1 to 8 carbon atoms. The individual blocks of alkyl methacrylate possess an average molecular weight of at least 4000 and the total block copolymer has an average molecular weight of up to 150,000, in each case expressed as number average ($M_n$).

11 Claims, No Drawings

INORGANIC POWDER COMPOSITION CONTAINING POLYMERIC AUXILIARIES AND USE THEREOF

This application is a continuation of application Ser. No. 08/160,735, filed Dec. 3, 1993, now abandoned.

The processing of inorganic powders with organic auxiliaries is mostly based on empirical processes and often on the use of natural materials which are deleterious to good reproducibility of the process. Thus, for example, oxidic powders are cast in admixture with fish oil as dispersant and poly(vinyl butyral) as binder to produce green ceramic sheets which are subsequently fired to form ceramics. The reproducibility of this process does not meet the requirements of a manufacturing process having close tolerances, as is required in, for example, microelectronics. The unsatisfactory reproducibility of the process is due, when fish oil is used, at least in part to the latter's insufficient stability on storage because of its autooxidative properties or its decomposition under microbial action.

The auxiliaries presently used in such processes often require the use of more or less environmentally polluting solvents. Thus, mixtures of trichloroethylene and ethanol are used together with fish oil as dispersant and poly(vinyl butyral) as binder in the processing of $\alpha$-$Al_2O_3$ powders. All in all, in ceramic sheet casting technology no processes using environmentally friendly aqueous solutions have become generally established in the production area.

The dispersants and binders used in ceramics have been found by empirical selection. In many cases such dispersants are soap-like low molecular weight materials (cf. F. Aldinger, H. Kalz, Angew. Chem., 26, 371–381, 1987). In the selection of these materials, although the specific active properties of hydrophilic binding groups and the stabilizing effect of hydrophobic hydrocarbon chains have been achieved on the basis of empirical selection, they have, however, not been optimized in the sense of the best and most reproducible effect. In particular, in the low molecular weight dispersants the multifunctional action of polymeric binding and stabilizing groups is not used.

An object of the present invention is therefore to provide improved auxiliaries for the processing of inorganic powders, these being improved in that, for example, the precision of components which are produced from inorganic powder plus the auxiliaries as additive, i.e. the consistency of their sintering shrinkage, can be reliably maintained after prolonged storage of the auxiliaries themselves or of the green parts and in that generally increased process stability can be achieved.

This object is achieved by an inorganic powder composition comprising inorganic powder, dispersant and binder, the characteristic feature of which is that the dispersant and/or binder used is a block copolymer comprising the units methacrylic acid and alkyl methacrylate in which the alkyl radical contains from 1 to 8 carbon atoms, preferably from 1 to 5 carbon atoms, the individual blocks of alkyl methacrylate possessing an average molecular weight of at least 4000 and the total block copolymer having an average molecular weight of up to 150,000, in each case expressed as number average ($M_n$).

The anionic polymerization of alkyl methacrylate and tertiary-butyl methacrylate to give block copolymers and the polymer-analogous saponification of the tertiarybutyl methacrylate blocks to methacrylic acid blocks has already been described in the literature, see EP-A 298 667. The surface-active properties of the two-block copolymers are described there, but those skilled in the art will not find references to possible applications in the area of powder processing.

Block copolymers having a low proportion of methacrylic acid have been prepared by Billingham et al. via group transfer reactions, and their exceptional effectiveness as dispersants for aluminum oxide in the sheet casting process has been claimed (N. C. Billingham, S. P. Rannard, J. Mykytiuk, S. P. Armes and O. Hoad, "Macromolecules '92", University of Kent, Sep. 7–11, 1992). In their publication the authors refer to a disclosure in Advanced Materials, 4, 73 (1992), which however contains nothing about corresponding block copolymers.

In the composition of the invention the block copolymers are used in an amount of from 0.5 to 10% by weight, preferably from 1 to 7.5% by weight, particularly preferably from 2 to 5% by weight, based on the total weight of solids contained in the total mixture. Furthermore, poly(vinyl butyral) or other additives such as for example plasticizers can be added if desired in an amount of from 0 to 8% by weight, preferably from 0 to 5% by weight, likewise based on the total weight of solids contained in the total mixture. Suitable inorganic powders are oxidic materials such as aluminum oxidic, titanium dioxide, aluminum titanate, zirconium dioxide, piezoceramic powders, silicon dioxide or mixtures thereof and even nonoxidic materials such as aluminum nitride, silicon carbide or silicon nitride or ferroelectric powders or other oxides, carbides, nitrides or borides.

The dispersing activity of organic auxiliaries is based on an adsorption activity of the auxiliary on the inorganic material with simultaneous solubilization, i.e. an interaction between the auxiliary and the surrounding medium. The block copolymers of the invention comprising methacrylic acid (MAA/block A $\triangleq$ bonding block) and alkyl methacrylate (MMA/block B $\triangleq$ stabilizer block) are therefore advantageous for use as dispersants, because in them the function of adsorption on the inorganic surface in the block A and the function of the interaction with the surrounding liquid medium with block B can be independently optimized. Unlike low molecular weight soaps, the block copolymers of the invention surprisingly offer the advantage of having, because of their polymeric nature, a multiple activity both with respect to adsorption on the basis of the A blocks and with respect to solubilization based on the B blocks. The synthesis of the block copolymers of the invention is by anionic polymerization of tertiary-butyl methacrylate (TBMA) and alkyl methacrylate (MMA) to give the corresponding precursor block copolymers (poly-TBMA-block-MAA) from which the desized block copolymers (poly-MAA-block-MMA) are obtained by saponification of the TBMA block). In order to optimize the effectiveness of these polymeric auxiliaries, these have been varied systematically both with respect to their block lengths and with respect to their total degree of polymerization. The prerequisite for the sought-after optimization is precise control of the synthesis with the aim of a very narrow distribution of the degree of polymerization within both blocks of the copolymer.

The dispersant activity of the block copolymers of the invention was investigated by means of a sedimentation test under standardized conditions. The result of the sedimentation test was the sedimentation density in % of the theoretical density of the inorganic material, here $\alpha$-$Al_2O_3$.

Surprisingly, there was not only a clear dependence of the effectiveness of the auxiliaries on their chemical structure, but also a narrow structural window having unexpectedly outstanding effectiveness, which is made clear particularly in Example 2. The best dispersibility is found in those samples in which the total degree of polymerization is low, i.e. approximately in the range of from 50 to 120, and in which simultaneously the length of the A blocks is short. The sedimentation tests indicate that the dispersant activity of the block copolymers of the invention is at least as good as that of soluble fish oil.

The adsorption process of the block copolymers of the invention is based on specific interactions between the carboxyl groups of the MAA blocks with the OH groups or other polar groups of the powder surface. The adsorption test results are consistent with the above in that at dispersant concentrations of as low as about 10 mg/ml in the solution in contact with the powder there is an obvious coating of the powder surface, as is shown in Example 3.

The stability to autooxidation during storage is incomparably better for the block copolymers of the invention than for fish oil, and the reproducibly high quality because of the synthetic process is also clearly more favorable than that of the fish oil with its natural quality variations, which is illustrated in more detail in Example 4.

The usefulness of the block copolymers of the invention as dispersants for $\alpha$-$Al_2O_3$ was tested in the sheet casting process itself, the block copolymers being used in one case as fish oil substitute in a customary process mixture containing poly(vinyl butyral) as binder, whereby qualitatively good green sheets were obtained. In another series of experiments the block copolymers were used as both dispersant and binder, i.e. without addition of poly(vinyl butyral) or other auxiliaries, and cast to form green sheets. The green sheets obtained were comparable in quality with those produced with added binder. It must be emphasized that the multifunctional usefulness of these special polymers was thereby demonstrated, and a simplification of the sheet casting process is thereby possible, as is clearly shown in Example 6.

EXAMPLE 1

Synthesis of Poly(MAA-block-MMA)

The preparation of the block copolymers was carried out by anionic polymerization of tertiary-butyl methacrylate (TBMA) and methyl methacrylate (MMA) in THF at from −60° to −80° C. For the anionic polymerization, a special all-glass apparatus was constructed which allowed purification of the components, their mixing and also the actual synthesis under vacuum or inert gas conditions. The apparatus was carefully freed of moisture and oxygen by multiple cycles of heating/cooling and evacuation/flushing with inert gas. The monomers were freed of stabilizers and carefully purified, inter alia by reaction with triethylaluminum to remove alcohol residues which would otherwise act as a terminator.

The actual polymerization was carried out with a diphenylhexyllithium catalyst (DPHLi) which had been freshly prepared beforehand each time from diphenylethylene (DPHE) and n-butyllithium (n-BuLi). As additive to this catalyst a 5 molar excess of lithium chloride was used as regulator. LiCl because of various complexation and association equilibria with the monomers reduces not only the reaction rate of the polymerization, but also effects a considerable narrowing of the molecular weight distribution. Only thus is an exact setting of the block lengths possible. The synthesis was carried out by initially charging the catalyst and regulator in THF, building up of the poly-TBMA block and subsequent additive polymerization of the poly-MMA block. A typical reaction batch (for A 18, cf. Table 1) is:

500 ml of THF, 30 ml of DPHLi, 128 mg of LiCl, 5.0 g of TBMA and 2.5 g of MMA.

The first monomer was allowed to react for about one hour before the second monomer was added. The polymerization was terminated by precipitation of the copolymer in alcohol.

In a first synthesis series, copolymers were prepared which have TBMA and MMA blocks of essentially the same length, their total molecular weight however varying between 8000 and 140,000. The exact details are shown in Table 1 below:

TABLE 1

| Sample No. | TBMA/MMA ($^1$H-NMR) | $M_n$ (GPC) | $M_w/M_n$ (GPC) | $P_n$ (GPC) |
|---|---|---|---|---|
| A 20 | 1.1 | 4,405 | 1.18 | 48 |
| A 43 | 0.95 | 7,682 | 1.08 | 83 |
| A 19 | 2.0 | 8,300 | 1.12 | 53 |
| A 17 | 1.2 | 14,000 | 1.10 | 90 |
| A 25 | 1.4 | 17,500 | 1.04 | 112 |
| A 18 | 1.4 | 20,000 | 1.09 | 127 |
| A 16 | 1.3 | 30,000 | 1.06 | 191 |
| A 12 | 1.0 | 40,000 | 1.04 | 255 |
| A 11 | 1.0 | 60,000 | 1.07 | 382 |
| A 13 | 1.8 | 140,000 | 1.08 | 892 |

TBMA/MMA indicates the ratio of the chain lengths of the individual blocks,
$M_n$ is the average molecular weight of the block copolymers expressed as a number average,
$M_w/M_n$ is a measure of the individual deviations of the molecular weights from the average found,
$P_n$ is the average degree of polymerization (number average).

The poly-TBMA blocks were subsequently saponified by treatment with HCl/dioxane (25/75 parts by volume) and converted into polymethacrylic acid blocks. The hydrolysis was monitored by means of infrared and $^1$H-NMR spectroscopy, and was complete.

EXAMPLE 2

Interaction with Aluminum Oxide; Sedimentation Behavior

The effectiveness of the block copolymers as dispersants for aluminum oxide with trichloroethylene/ethanol as medium was tested in a standard sedimentation test. For comparison, both the unsaponified samples nos. A 11 to A 43 and the saponified examples nos. B 1 to B 43 were used. The results are summarized in Table 2.

TABLE 2

| Sample No. | $P_n$ | SD (%) | Sample No. | $P_n$ | SD (%) |
|---|---|---|---|---|---|
| A 20 | 48 | —*) | B 20 | 48 | 52 |
| A 43 | 83 | —*) | B 43 | 48 | 50 |
| A 17 | 90 | 35 | B 17 | 90 | 47 |
| A 25 | 112 | 35 | B 25 | 112 | 41 |
| A 18 | 127 | 35 | B 18 | 127 | 40 |
| A 16 | 191 | 35 | B 16 | 191 | 32 |
| A 12 | 255 | 35 | B 12 | 255 | 30 |
| A 11 | 382 | 35 | B 11 | 382 | 30 |
| A 13 | 892 | 35 | B 13 | 892 | 30 |

(Series A before saponification, series B after saponification);
*)not determined;
SD is the sedimentation density (%) based on the theoretical density of the ceramic. The SD values were obtained by in each case volumetrically determining the density of the powder sediment.

As is to be expected, the unsaponified block copolymers have only a very low effectiveness as dispersants, the achieved sedimentation density of 35% lying only just above the effectiveness of the trichloroethylene/ethanol mixture (31%). It is however surprising that the sedimentation behavior does not depend on the degree of polymerization of the samples.

The saponified samples having polymethacrylic acid blocks as bonding groups have a dispersant activity which increases with decreasing degree of polymerization and which is clearly greater than the effectiveness of fish oil (42%).

EXAMPLE 3

Adsorption Behavior

To characterize the interaction of the saponified block copolymers with aluminum oxide, the polymer samples were subjected to a standard adsorption test and the adsorption isotherms were determined. A typical measurement is shown in Table 3, in which the sample B 13 was used. It can be seen that even at very low concentrations the block copolymer is adsorbed comparatively strongly, which indicates a specific interaction between the polymethacrylic acid blocks used as bonding groups and the $Al_2O_3$ surface.

TABLE 3

| Initial concentration (mg/ml)*) | Residual concentration (mg/ml)**) | Amount adsorbed (mg/m$^2$)***) |
| --- | --- | --- |
| 10 | 0.2 | 0.96 |
| 20 | 0.3 | 1.44 |
| 40 | 16 | 2.35 |
| 80 | 53 | 2.64 |

*)Concentration of the dispersant in the contacting solution;
**)Residual concentration after adsorption in the supernatant solution;
***)Amount of dispersant adsorbed on $Al_2O_3$.

Even from relatively low equilibrium concentrations the inorganic surface becomes saturated.

EXAMPLE 4

Reproducibility/Chemical Stability

The synthesis of the block copolymers is easily reproducible (better than 1% deviation) both in respect of the total molecular weights and in respect of the lengths of the blocks A or B and only depends on the care taken in preparation. Hence these special polymers are available in any amount and at any time.

The chemical stability and in particular the shelf life far exceed those of fish oil; whereas fish oil is no longer usable after storage for only one to two days in air at room temperature, the polymers can be stored for any length of time under these conditions without losing their effectiveness. This was confirmed by comparison of the sedimentation behavior of freshly prepared polymers with that of polymers after storage for eight weeks as powder in air at room temperature.

EXAMPLE 5

Green Sheets with Addition of PVB

To test the sheet casting behavior of the block copolymers of the invention, they were processed into green sheets as follows:

85 mg of the polymer sample B 19 were dissolved in 2.8 g of trichloroethylene/ethanol by stirring at room temperature and 3 g of $\alpha$-$Al_2O_3$ powder were added. The mixture was sonicated for 15 minutes and subsequently shaken on a shaking table overnight. Subsequently 200 mg of poly(vinyl butyral) and 100 mg of polyglycol were added to the mixture, this was again sonicated for 15 minutes and subsequently shaken on a shaking table overnight. This mixture was cast at room temperature onto a continuous tape and the solvent was allowed to evaporate in air. For analysis, the sheets obtained were dried at 50° C. in vacuo. The quality of the sheets was excellent.

EXAMPLE 6

Green Sheets without Addition of Other Auxiliaries

Analogously to the process described in Example 5, 425 mg of the polymer sample B 25 were dissolved in 2.8 g of trichloroethylene/ethanol and 3 g of powder were added. This mixture was sonicated for 15 minutes and shaken on the shaking table overnight before being cast into sheets under standard conditions. Without any addition of other organic auxiliaries, green sheets were obtained with a quality comparable with those from Example 5.

We claim:

1. An inorganic powder composition comprising inorganic powder, dispersant and binder, wherein the dispersant and/or binder comprises a saponified block copolymer containing (A) units of methacrylic acid and (B) units of alkyl methacrylate in which the alkyl radical comprises from 1 to 8 carbon atoms, and the total block copolymer before saponification having an average molecular weight of 4,405 to 20,000, in each case expressed as number average ($M_n$), and wherein said block copolymer is present in an amount of about 0.5 to 10% by weight, calculated on the total weight of solids in the total composition, and wherein chain length ratio of the methacrylic acid block to the alkyl methacrylate block within the block copolymer ranges from about 0.95 to about 2.0.

2. Inorganic powder composition as claimed in claim 1, containing the block copolymer in an amount of about 1 to 7.5% by weight, calculated on total weight of solids comprised in the total mixture.

3. Inorganic powder composition as claimed in claim 2, containing the block copolymer in an amount of about 2 to 5% by weight, calculated on total weight of solids comprised in the total mixture.

4. Inorganic powder composition as claimed in claim 1, comprising additionally polyvinylbutyral and/or plasticizers in an amount from 0 to 8% by weight, calculated on total weight of solids comprised in the total mixture.

5. Inorganic powder composition as claimed in claim 4, comprising additionally polyvinylbutyral and/or plasticizers in an amount from 0 to 5% by weight, calculated on total weight of solids comprised in the total mixture.

6. Inorganic powder composition as claimed in claim 1, wherein the inorganic powder comprises aluminum oxide, aluminum nitride or aluminum titanate.

7. An inorganic powder composition of claim 1, wherein the total degree of polymerization of said block copolymer containing (A) units of methacrylic acid and (B) units of alkyl methacrylate is between 50 and 120.

8. An inorganic powder composition consisting essentially of inorganic powder, dispersant, and binder, wherein said dispersant and said binder consist essentially of a saponified block copolymer containing (A) units of methacrylic acid and (B) units of alkyl methacrylate in which the alkyl radical comprises from 1 to 8 carbon atoms, and the total block copolymer before saponification having an average molecular weight of 4,405 to 20,000, in each case expressed as number average ($M_n$), and wherein said block copolymer is present in an amount of 0.5 to 10% by weight, calculated on the total weight of solids in the total composition, and wherein the chain length ratio of the methacrylic acid block to the alkyl methacrylate block within the block copolymer is from about 0.95 to about 2.0.

9. An inorganic powder composition consisting essentially of inorganic powder, dispersant, and binder, wherein said binder consists essentially of poly(vinyl butyral) and said dispersant consists essentially of a saponified block copolymer which is soluble in an organic solvent at room temperature, said block copolymer containing (A) units of methacrylic acid and (B) units of alkyl methacrylate in which the alkyl radical comprises from 1 to 8 carbon atoms, the total block copolymer having an average molecular weight before saponification of 4,405 to 20,000, in each case expressed as number average ($M_n$), and wherein said block copolymer is present in an amount of about 0.5 to 10% by weight, calculated on the total weight of solids in the total composition, and wherein the chain length ratio of the methacrylic acid block to the alkyl methacrylate block within the block copolymer is from about 0.95 to about 2.0.

10. An inorganic powder composition of claim 1, wherein said chain length ratio of the methacrylic acid block to the alkyl methacrylate block within the block copolymer is about 1.0.

11. An inorganic powder composition of claim 1, wherein the relationship $M_w/M_n$ of the block copolymer ranges from about 1.04 to about 1.18.

* * * * *